United States Patent [19]

Stobb

[11] 4,019,639
[45] Apr. 26, 1977

[54] AUTOMATIC PALLETIZER AND METHOD FOR BUNDLED STACKS OF SHEETS

[75] Inventor: Walter John Stobb, Pittstown, N.J.
[73] Assignee: Stobb, Inc., Clinton, N.J.
[22] Filed: Jan. 26, 1976
[21] Appl. No.: 652,371
[52] U.S. Cl. .............................. 214/6 C; 93/93 DP; 214/1 Q; 214/152
[51] Int. Cl.² ....................................... B65G 57/28
[58] Field of Search ........... 214/1 Q, 6 C, 6 P, 6 H, 214/7, 152; 93/93 M, 93 DP; 271/215

[56] References Cited
UNITED STATES PATENTS

| 1,498,732 | 6/1924 | Jauch | 214/6 C |
| 2,934,219 | 4/1960 | Stumpf | 214/1 Q |
| 2,947,125 | 8/1960 | Wilson et al. | 214/1 Q X |
| 3,739,924 | 6/1973 | Stobb | 214/6 H |
| 3,807,579 | 4/1974 | Havens | 214/6 B |

FOREIGN PATENTS OR APPLICATIONS 2,234,936  1/1974  Germany ........................ 214/6 P Primary Examiner—L. J. Paperner
Attorney, Agent, or Firm—Arthur J. Hansmann

[57] ABSTRACT

An automatic palletizer for bundled stacks of sheets wherein bundles of sheets coming from a stacker are positioned on a receiver which collects and supports the stacks in a generally upstanding position. A tiltable pallet holder is adjacent the receiver and supports a pallet in an upright position, and the bundles of sheets are moved onto the pallet holder and against the pallet. Supports and controls are associated with the pallet holder for tilting the pallet holder to position the pallet in a horizontal position and thus have the bundles of sheets in a prone position on the horizontal pallet holder.

16 Claims, 4 Drawing Figures

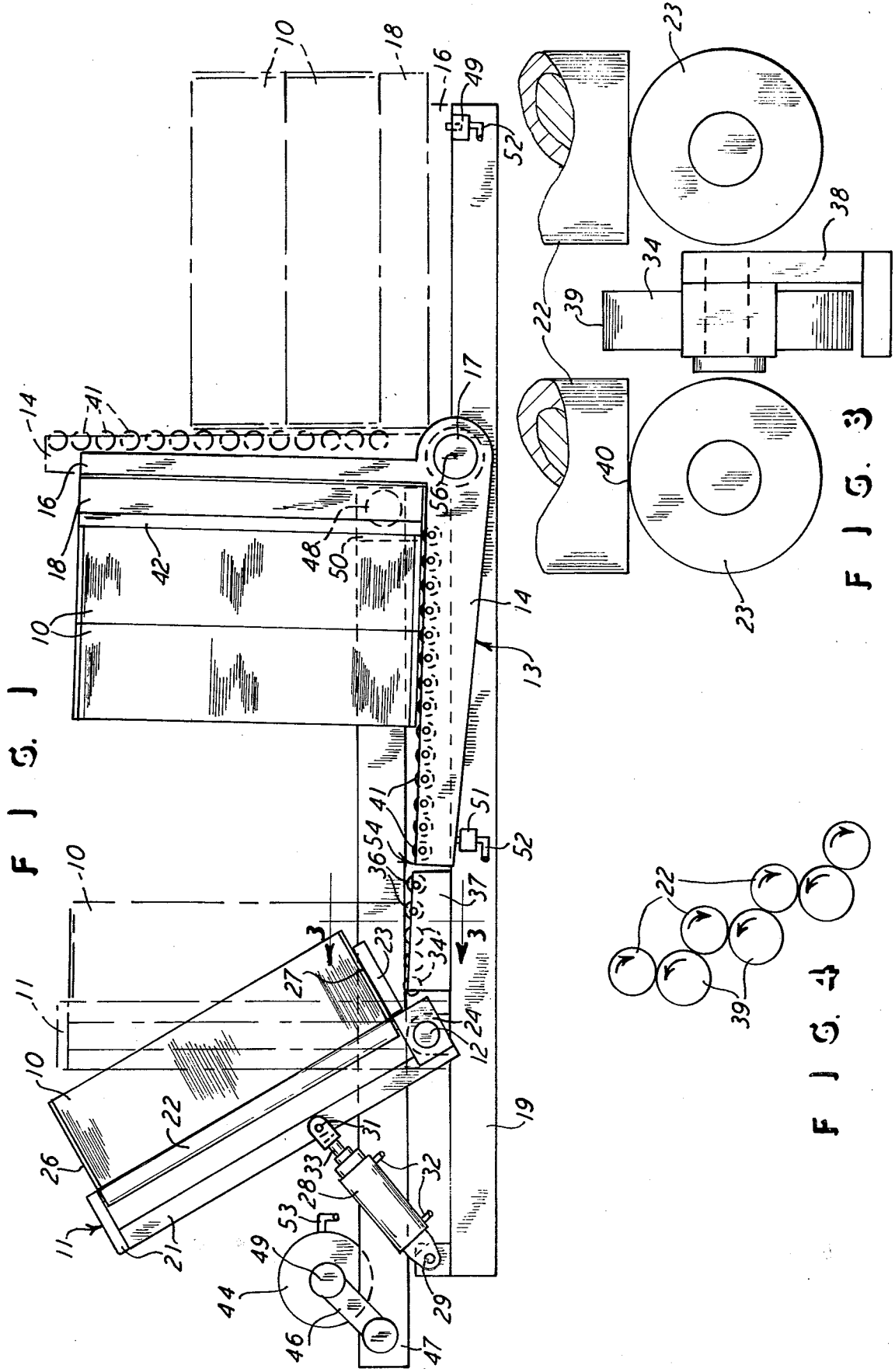

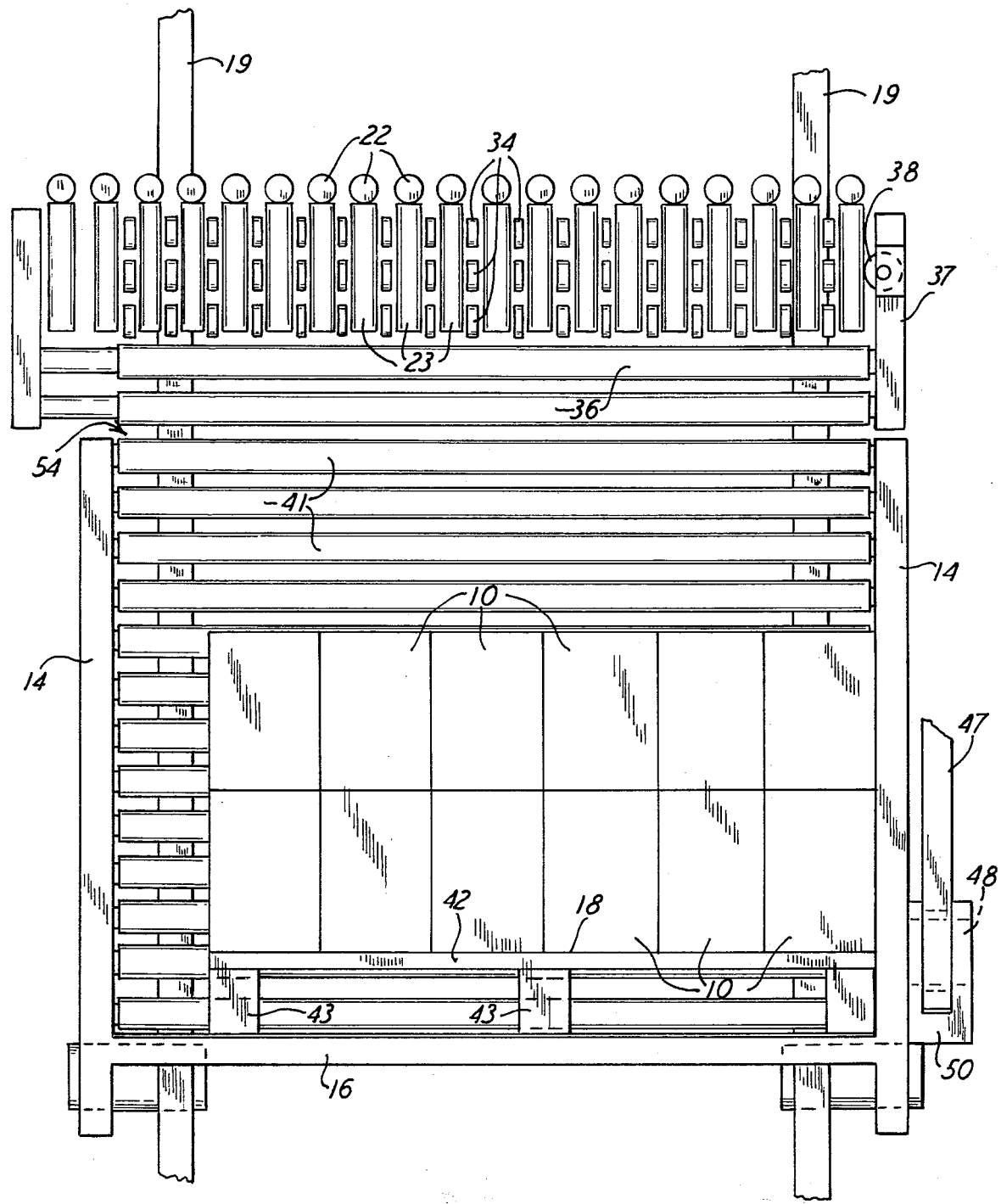

AUTOMATIC PALLETIZER AND METHOD FOR BUNDLED STACKS OF SHEETS

This invention relates to an automatic palletizer for bundled stacks of sheets, and, more particularly, it relates to an automatic palletizer which handles bundles of sheets formed and positioned in an upstanding position and which subsequently disposes the bundles of sheets in a prone position on a pallet.

BACKGROUND OF THE INVENTION

The prior art is already aware of stacker apparatus which collects and stacks sheets into discrete stacks or bundles. These stacks of sheets are then commonly secured into bundles, such as by being tied or clamped, and the bundles are then transported from the stacker and to an intermediate holding area or they may go directly to a feeder where the sheets are individually taken from the stack. In this prior art arrangement and method, the problem is in connection with handling the bundles of sheets to conveniently and expeditiously dispose them in a collection of a plurality of the bundles disposed in rows or the like. When an operator handles the bundles, the bundles must be small and light weight. Also, the printing and stacking apparatus is usually run independent of the feeder apparatus where the sheets are finally taken from the stack and are disposed individually for collating and the like. Therefore, the printing and stacking apparatus must necessarily be operated at a pace which will exceed the rate at which the sheets are moved to and through the feeder apparatus, and the handling and transporting and storage of the bundles of sheets in their movement from the stacker to the feeder is the matter of concern.

The present invention provides a way in which the bundles sheets can be efficiently handled in a mass collection of the bundles, and the bundles are efficiently and neatly and readily disposed onto a pallet, with a minimum of apparatus and a minimum of attention from the operator and without requiring any lifting equipment or the like. Accordingly, in accomplishing the objectives of this invention, the bundles of sheets are arranged in a row on the receiver equipment associated with the sheet stacker, and the row of the bundles of sheets are then positioned onto a pallet holder which is previously supplied with a pallet in an upstanding position, and the pallet holder will receive a pluarality of rows of bundles from the receiver, and the pallet holder can then be tilted to a position which will dispose the pallet horizontally and thereby support the bundles of sheets in the convenient prone position. Subsequently, a lift fork or the like can engage the pallet and move the plurality of bundles of sheets to the desired location.

As further background for this invention, U.S. Pat. Nos. 3,739,924 and 3,825,134 and 3,853,234 and 3,880,308 all show apparatus and method for bundling, transporting, and feeding sheets, and these patents particularly show the way in which sheets can be formed into stacks and bundles and are then moved from an original inclined position and to a vertical or upstanding position on a support or cart or the like, and rollers are employed for mobilizing the bundles of sheets to permit the collection in rows of upstanding bundles of sheets. However, that prior art does not concern itself with the automatic palletizing of bundles of sheets such that the bundles are positioned on a pallet in a horizontal or prone orientation, as in this invention. Further, U.S. Pat No. 3,717,075, for instance, shows the utilization of rollers and other movable supports on which sheets can be disposed in a stack and can be moved at right angles relative to the initial direction of sheet movement. Of course the citation of other patents on the aforesaid cited patents show prior art relative to the claimed subject matter in the aforesaid cited patents.

Accordingly, it is a primary object of this invention to provide apparatus for automatic palletizing of bundles of sheets as the bundles are formed directly on a sheet stacker, and such sheet stacker is of a conventional and well known type and may be constructed as shown in U.S. Pat. No. 2,933,314, for instance.

Further, the present invention provides a way, including apparatus and method, of automatically palletizing bundles of sheets such that the sheets come directly from a stacker and a bundling or tying mechanism and are disposed in rows on a receiver which in turn delivers the rows of bundles to a pallet holder having a pallet positioned thereon, and the holder is tiltable so that the pallet is disposed in a reclining position for transporting to a delivery or holding station, with the bundles thereon. Also, in accomplishing this objective, the present invention provides a way in which the stacks can be moved laterally on a receiver, such as by being driven through rotating rollers, and the receiver is tiltable such that when it is tilted to an upright position to remove the bundles therefrom, the drive to the rollers is automatically broken and thus discontinued, as desired.

Other objects and advantages will become apparent upon reading the following description in light of the accompanying drawings.

BRIEF DESCRIPTION OF THE DRAWINGS

FIG. 1 is a side elevational view of the palletizer of this invention, and with the dot-dash lines showing parts thereof in a second position.

FIG. 2 is a top plan view of the palletizer of FIG. 1, and with parts thereof removed and parts thereof broken away.

FIG. 3 is an enlarged front elevational view, viewed along the line 3—3 of FIG. 1, and showing certain parts of FIG. 1.

FIG. 4 is a view showing the receiver rollers and the drive means thereat.

DETAILED DESCRIPTION OF THE PREFERRED EMBODIMENT

The basic accomplishment of this invention is to provide apparatus and method for handling bundles of sheets which are processed by conventional sheet stackers and bundlers and which can be positioned on pallets at a holding station or a feeding station. To accomlish this, FIG. 1 shows a bundle of sheets 10 which is disposed in a reclining position on a receiver generally designated 11, and the receiver is pivotal about a shaft or support 12 such that the receiver can pivot up to the upright or vertical position as shown by the dot-dash lines in FIG. 1. The bundle 10 is actually only one of a row of bundles of maybe three to six bundles in the row, and the entire row is tipped to the upright position shown, and the row of bundles 10 is then moved onto a pallet holder, generally designated 13 and having a general right angle configuration of one leg 14 and another leg 16, and the pallet holder is tiltable or pivotal about a support or shaft 17. A pallet 18 is disposed in an upright position against the holder leg 16, as shown in FIG. 1, and the rows of bundles 10 are moved from the receiver 11 and onto the pallet holder 13 to the position shown in FIG. 1. When an adequate number of bundles 10 is on the holder 13, then the holder 13 can be tipped or pivoted through a 90° angle to position the bundles 10 and the pallet 18 to the dot-dash line position shown on the right hand end of FIG. 1. From that reclining or tilted position shown, the pallet 18, with the bundles 10 thereon, can be transported, such as by a conventional fork lift truck, to a holding or delivery station which is not shown. From this description, the method is herein disclosed and it will be apparent that the bundles 10 are processed by the stacker and bundler (not shown) and are disposed on the receiver 11 where they are formed in rows and are transferred to the tiltable pallet holder 13 and against the pallet 18 and from that position the bundles 10 are disposed in the reclining position, as described. Other details of the method will also be understood and are described herein.

In more detail, the drawings show frame pieces 19 extending along the opposite sides of the apparatus shown, and the receiver 11 and pallet holder 13 are supported on the pieces 19 by means of their respective shafts 12 and 17, for instance. The receiver 11 is shown to be tiltable and has frame members 21 and has a row of anti-friction members in the form of rotatably mounted rollers 22 disposed thereon, and the row of rollers 22 is seen in FIG. 2 and FIG. 3 shows two of such rollers 22. The receiver 11 also has a plurality of lower anti-friction members or rollers 23 rotatably inclined in the receiver 11, and FIGS. 2 and 3 also show these rollers 23. A mounting block or member 24 is included in the receiver 11 and provides a support for the rollers 22 and 23, as shown, and it will be seen that the rollers 22 and 23 are disposed with their axes at right angles in their respective rows. Therefore, a row of bundles of sheets 10 can be collected on the receiver 11, and the bundles 10 can be moved along the receiver 11 as the bundles rest on the rollers 22 and 23. That is, the bundles 10 are formed by a stacker and are tied by a bundler (neither of which is shown herein but which are of a conventional and well known construction) and the individual bundles 10 are positioned on the receiver 11 until a row of three to six bundles is formed on the receiver 11. For further description, reference is made to U.S. Pat No. 2,933,314 which shows a stacker forming bundles of sheets at a declining angle such as that shown in FIG. 1 hierein, and U.S. Pat. Nos. 3,739,924 and 3,853,234 show bundling apparatus which compresses a formed stack and binds same. Therefore, it will be understood that the bundles 10 are a collection of sheets of printed paper or the like, and end boards 26 and 27 are disposed on the top and bottom of each bundle 10, and it will also be understood that the bundle can be clamped or bound by wire or the like, all in the usual manner and one which is well known to a person skilled in the art.

A powered drive, such as the fluid cyclinder assembly 28, is disposed between the frame 19 and the receiver 11 to control the tilted position of the receiver 11 between the full line and the dot-dash line positions shown. The assembly 28 is pivotally mounted to the stationary piece 19 by means of the pin 29, and it is also hingedly connected to the receiver 11 by means of the pin 31. Thus, with conventional fluid power applied to the assembly 28, through the fluid hoses 32, extension and contraction of the cylinder assembly rod 33 will effect the tilting action of the receiver 11, as mentioned. When the receiver 11 is tilted to the upright position shown by the dot-dash lines, then the row of bundles 10 is disposed on anti-friction members having horizontal axes and being in the form of a plurality of wheels 34 and rollers 36, both of which are mounted on fixed horizontal axes, and the rollers 36 are on the side frame member 37, and the wheels 34 are mounted on brackets 38, as shown in FIG. 3. FIG. 3 further shows that the wheels 34 are disposed and are of a diameter such that the uppermost surface designated 39 is above the uppermost surface designated 40 on the rollers 23, in the upright position of the receiver 11. Therefore, the bundles 10 are resting on the wheels 39 and the rollers 36, and they are not on the then transversely disposed rollers 23, and thus the row of bundles 10 can move directly toward the pallet holder 13. Therefore, the arrangement of the receiver 11, and particularly the location and provision of the lower rollers 23 and the amount of the tilt of the receiver 11 to the dot-dash position described, is such that the bundles 10 no longer rest on the rollers 23 in the upright position, and thus the bundles are on the anti-friction members 34 and 36, for the purpose mentioned.

At this time it will also be mentioned that the bundles 10 coming from the unshown stacker and bundler, are formed in the row on the receiver 11 and can move against a stop designated 38 in FIG. 2 and shown in the form of a roller having a vertical axis and mounted on the stationary piece 37 on that side of the apparatus shown. Therefore, the row of bundles 10 would extend from the stop roller 38 and along the support rollers 22 and 23 and would be in a row of three to six bundles, for instance. Still further, the rollers 22 could have powered drive means applied thereto to rotate the rollers 22 in a direction which would cause the bundles 10 to move to the stopped position on the receiver 11. To accomplish this, FIG. 4 shows some of the rollers 22 in rolling or driving relation with cylindrical drive members 39, and these may be rollers which are disposed behind the rollers 22 and parallel thereto, and the rollers 22 and 39 may be of a friction surface, such as rubber or the like, such that powering the rollers 39 in the counterclockwise direction as shown by the arrows thereon will cause the receiver rollers 22 to rotate in the clockwise direction as shown by the arrows thereon. With that arrangement, when the receiver 11 is in the reclining or full line position shown in FIG. 1, the rollers 22 are being driven in an appropriate direction to move the bundles 10 from the unshown bundler and toward the stop 38; and, subsequently, when the receiver 11 is tilted to the dot-dash line position of FIG. 1, then the rollers 22 of course move away from the drive means 39, and the rollers 22 are therefore no longer being driven and thus the bundles 10 retain their position on the receiver 11 until they are tilted to the upright position and moved to the pallet holder 13.

The pallet holder arms or legs 14 rotatably supports a plurality of anti-friction members in the form of rollers 41 spaced therealong, as shown in FIGS. 1 and 2. The rollers 41 are shown at a slightly lower level than the rollers 36 which receive the bundles 10 from the receiver 11. Thus, the row of bundles 10 can be easily moved over the rollers 26 and onto the rollers 41 and toward the pallet 18, and the bundles 10 can form rows of bundles on the pallet holder 13, such as shown by the two rows of bundles 10 in FIGS. 1 and 2. The rollers 36, and also the wheels 34, could be powered, in any conventional drive arrangement, and thus the bundles 10 could be positively moved to the rollers 41 which could also be powered, in any conventional manner. Also, the bundles 10 could be pushed manually over the wheels 34 and rollers 36 and onto and over the rollers 41 to the position shown against the pallet 18, for instance.

When a desired number of bundles 10 is on the pallet holder 13, then the pallet holder can be pivoted or tilted about its pivot support 17, such that the rollers 41 are now disposed generally in the upright plane, as shown by the dot-dash lines in FIG. 1, along with the upright showing of the arm 14. That of course also meant that the pallet holder arm 16 moved to a substantially horizontal position, as shown by the dot-dash lines on the right-hand side of FIG. 1. Therefore, the pallet 18 and the bundles 10 are disposed in the reclining position, and they are ready to be transported to a feeder or a holding station. FIG. 2 shows that the pallet 16 is of a conventional construction and has a flat member 42 and pedestal members 43, and thus the pallet 18 is arranged to have a conventional fork lift truck pick up the pallet 16 along with the bundles 10 thereon.

FIGS. 1 and 2 also show that the pivoting or tilting action of the pallet holder 13 is under power, and a power means, such as a motor 44 is suitably arranged and has a drive arm 46 connected to a drive link 47 which connects to the pallet holder 13 through a shaft 48. Thus, suitable rotation of the motor shaft 49 will cause swinging of the arm 16 and displacement of the link 47 and in turn will cause the pivotal action of the pallet holder 13 about its support member 17. Sensors, in the form of limit switches 49 and 51 are disposed in the path of movement of the pallet holder legs 16 and 14, respectively, and the switches have connections designated 52 which extend to suitable connections 53 on the motor 44, and thus the energizing of the motor 44 is governed by the limit switches 49 and 51 according to the angle of pivot of the pallet holder 13, as will be apparent to one skilled in the art. Also, the position of the pallet holder arm 14 in the loading mode as shown by full lines in FIG. 1 is such that the upper circumferential or tangential surface of the rollers 41 is on a slight decline from the location of the entrance designated 54 to the pallet holder 13 and toward the pallet holder leg 16, and this decline may be an angle of 1° to 2° arranged so that the bundles 10 will move by gravity from the first roller 41 adjacent the receiver 11 and to the final position toward the pallet 18. Also, the wheels 34 and rollers 36 may be at that same declining angle of 1° to 2° so that the bundles 10 will move under the force of gravity and toward the pallet holder 13, as desired.

In this apparatus and method, the pallet 18 is then disposed on the pallet holder 13 with the pallet plate or floor 42 faced toward the pallet holder entrance 54 which is on the side thereof opposite from the locaion of the pallet 18. Also, the shaft or pivotal support member 17 has its horizontally disposed axis 56 located substantially coincident with the vertical plane of the pallet holder leg 16 and the pallet floor 42, at least within the description and explanation given herein. Therefore, the pallet holder 13 is pivotal through a right angle or an approximate 90° angle between the full line position and the dot-dash line position shown. In this arrangement, the pallet holder leg 16 serves as an upright support for the pallet 18 in the bundle loading position described. Also, the pallet holder 13 is of a right angle configuration relative to its legs 14 and 16, and the leg 14 serves as a bed for the loading of the bundles thereon, and the holder 13 is therefore the collecting means. Further, the power means of the motor 44 and the drive link or arm 47 are operatively connected with the shaft 48 and a block 50 which is integral with the pallet holder 13, to thus induce the tilting or pivoting of the pallet holder 13, as described above.

What is claimed is:

1. An automatic palletizer for bundled stacks of sheets, comprising a sheet stack receiver for receiving a plurality of bundles of sheets disposed in stacked relation, a tiltable pallet holder pivotally and generally horizontally disposed adjacent said receiver and having an entrance on the side thereof toward said receiver for receiving said bundles of sheets from said receiver and for uprightly supporting said bundles of sheets when said bundles of sheets are moved onto said pallet holder, a pallet disposed on said pallet holder and at the side thereof opposite from the location of said entrance and with said pallet having a floor disposed in an upright position, anti-friction supports interpositined between said bundles of sheets and said pallet holder for movably supporting said bundles of sheets on said pallet holder and mobilizing said bundles of sheets from said entrance and toward said pallet, said pallet holder being pivotally mounted for tilting said pallet holder through an angle to a position to dispose said pallet and said bundles of sheets in generally horizontal positions, said receiver being tiltably mounted to be disposed in a first position away from said pallet holder and to be disposed in a second position tiltable toward said pallet holder for moving said bundles of sheets onto said pallet holder, anti-friction members rotatably mounted on said receiver for engaging and movably supporting said bundles of sheets, a driver in driving engagement with said anti-friction members to rotate said anti-friction members to move said bundles of sheets, rotatable members included in said driver and being in driving rolling contact with said anti-friction members and disposed to be in said contact when said receiver is in its said first position and to be out of said contact when said receiver is in its second position tilted toward said pallet holder, to thereby interrupt the drive to said anti-friction members.

2. The automatic palletizer for bundled stacks of sheets as claimed in claim 1, wherein said anti-friction members are disposed in two groups rotatable on respective axes at right angles to each other, with one of said groups being axially oriented for moving said bundles of sheets along said receiver and the other of said groups being axially oriented for moving said bundles of sheets away from said receiver and onto said pallet holder.

3. The automatic palletizer for bundled stacks of sheets as claimed in claim 1, including a powered member connected with said receiver for tilting said receiver between the first position and the second position.

4. The automatic palletizer for bundled stacks of sheets as claimed in claim 1, wherein said anti-friction supports are included in said pallet holder and consist of movable means mounted and arranged for movement of said bundles of sheets from said entrance and toward said pallet.

5. The automatic palletizer for bundled stacks of sheets as claimed in claim 1, wherein said pallet holder includes an upright support for abutting and positioning said pallet floor in the upright position.

6. The automatic palletizer for bundled stacks of sheets as claimed in claim 1, including a motor operatively connected with said pallet holder for pivoting said pallet holder, and sensing controls operatively connected with said motor and being in the path of pivotal movement of said pallet holder for actuating said motor to effect end limit pivoting of said pallet holder.

7. The automatic palletizer for bundled stacks of sheets as claimed in claim 1, wherein said pallet holder is of a right angle configuration with one leg thereof being on said side thereof toward said receiver and serving as a bed for the initial stacking of said bundles of sheets, said anti-friction supports being only on said one leg for the movement of said bundles of sheets thereon, and the other leg of the right angle configuraion being on said side opposite from said pallet holder entrance and supporting the pallet in the initial vertical position, and a pivot mounting member connected with said pallet holder for pivotal movement of said pallet holder.

8. The automatic palletizer for bundled stacks of sheets as claimed in claim 1, wherein said pallet holder includes a bed portion for initially supporting said bundles of sheets moving from said receiver, and a support for said pallet holder and arranged to dispose said bed at a slightly declining angle from said entrance for gravitational movement of said bundles of sheets along said bed.

9. The automatic palletizer for bundled stacks of sheets as claimed in claim 1, wherein said anti-friction members of said receiver are disposed for supporting the bundle of sheets thereon and with said anti-friction members having upper surfaces in contact with the bundles of sheets and with the said upper surfaces being disposed at a declining angle relative to the horizontal and toward said pallet holder for effecting movement of the bundles of sheets under the force of gravity and along said anti-friction members.

10. The automatic palletizer for bundled stacks of sheets as claimed in claim 1, wherein said anti-friction supports include upper surfaces for supporting the bundles of sheets and with said upper surfaces being disposed at a declining angle relative to the horizontal and in the direction away from said receiver, for movably supporting the bundles of sheets by virtue of the force of gravity.

11. The automatic palletizer for bundled stacks of sheets as claimed in claim 1, wherein said receiver is tiltably mounted to be disposed in a reclining position for said first position.

12. An automatic palletizer for bundled stacks of sheets, comprising a sheet stack receiver for receiving a plurality of bundles of sheets disposed in stacked relation, a tiltable pallet holder pivotally and generally horizontally disposed adjacent said receiver and having an entrance on the side thereof towad said receiver for receiving said bundles of sheets from said receiver and for uprightly supporting said bundles of sheets when said bundles of sheets are moved onto said pallet holder, a pallet disposed on said pallet holder and at the side thereof opposite from the location of said entrance and with said pallet having a floor disposed in an upright position, anti-friction supports interpositioned between said bundles of sheets and said pallet holder for movably supporting said bundles of sheets on said pallet holder and mobilizing said bundles of sheets from said entrance and toward said pallet, said pallet holder being pivotally mounted for tilting said pallet holder through an angle to a position to dispose said pallet and said bundles of sheets in generally horizontal positions, said receiver being tiltably mounted to be disposed in a first position away from said pallet holder and to be disposed in a second position tiltable toward said pallet holder for moving said bundles of sheets onto said pallet holder, anti-friction members rotatably mounted on said receiver for engaging and movably supporting said bundles of sheets, a driver in driving engagement with said anti-friction members to rotate said anti-friction members to move said bundles of sheets, said anti-friction members being disposed in two groups rotatable on respective axes at right angles to each other, with one of said groups being axially oriented for moving said bundles of sheets along said receiver and the other of said groups being axially oriented for moving said bundles of sheets away from said receiver and onto said pallet holder.

13. The automatic palletizer for bundled stacks of sheets as claimed in claim 12, wherein said anti-friction members of said receiver are disposed for supporting the bundle of sheets thereon and with anti-friction members having upper surfaces in contact with the bundles of sheets and with the said upper surfaces being disposed at a declining angle relative to the horizontal and toward said pallet holder for effecting movement of the bundles of sheets under the force of gravity and along said anti-friction members.

14. The automatic palletizer for bundled stacks of sheets as claimed in claim 12, wherein said anti-friction supports include upper surfaces for supporting the bundles of sheets and with said upper surfaces being disposed at a declining angle relative to the horizontal and in the direction away from said receiver, for movably supporting the bundles of sheets by virtue of the force of gravity.

15. A means for automatic palletizing of bundles of sheets, comprising a tiltable means for receiving a row of bundles of sheets, a tiltable collecting means disposed adjacent said tiltable means and having an entrance for collecting said row of bundles of sheets from said tiltable means when the latter is tilted toward said collecting means, support means upstandingly disposed on said collecting means at the side thereof opposite said entrance and disposed to have said bundles of sheets supported against said support means in an upstanding position, said collecting means being tiltable through an angle and toward said side thereof with said support means for disposing said support means in a reclining position with said bundles of sheets thereon and in the reclining position, said tiltable means being tiltable toward and away from said collecting means, rotatable support means on said tiltable means for movably supporting said bundles of sheets thereon and being disposed in two groups rotatable on respective axes at right angles to each other, with one of said groups being axially oriented for moving said bundles of sheets along said tiltable means and the other of said groups being axially oriented for moving said bundles of sheets away from said tiltable means and onto said collecting means.

16. A method for automatic palletizing of bundles of sheets, comprising the steps of disposing a pallet in upstanding position on a tiltable holder, disposing said bundles on a tiltable receiver disposed adjacent said tiltable holder and receiving a row of said bundles thereon, power driving said bundles on said receiver in one tilted position of said receiver, tilting said receiver toward said holder and thereby interrupt the power drive and move said row of said bundles onto said tiltable holder and toward said pallet, positioning the plurality of bundles of sheets in upstanding positions on a declining anti-friction support on said tiltable holder for moving said bundles under gravity to adjacent said pallet, tilting said tiltable holder in the direction toward said pallet and disposing said pallet and said bundles in reclining positions with said bundles on said pallet.

* * * * *